MAGNETIC RECORDING MEDIA

Filed March 26, 1971 2 Sheets-Sheet 1

YASURO NAGAZONO
& TERUFUMI KAMIJO
INVENTORS

BY Clario Ocera, agt.

Yasuro Nagazono
& Terufumi Kamijo
INVENTORS
BY Clario Ceccon, agt.

United States Patent Office
3,681,137
Patented Aug. 1, 1972

3,681,137

MAGNETIC RECORDING MEDIA

Yasuro Nagazono and Terufumi Kamijo, Tokyo, Japan, assignors to TDK Electronics Company Ltd., Tokyo, Japan Filed Mar. 26, 1971, Ser. No. 128,410
Claims priority, application Japan, Apr. 7, 1970, 45/29,207
Int. Cl. H01f *10/02*
U.S. Cl. 117—235 3 Claims

ABSTRACT OF THE DISCLOSURE

Magnetic recording media may be prepared by mixing a magnetic powder with a binder which is obtained by adding 10–50% by weight of butyl cellulose acetate resin to a mixture of 40–80% by weight of urethane prepolymer and 20–60% by weight of urethane elastomer and by adding further, as a hardener, an aromatic polyamine in a stoichiometric amount with respect to the —NCO groups in the urethane prepolymer.

This invention relates to magnetic recording media and, more particularly, to magnetic recording tape of excellent abrasion-resistant property.

Heretofore, blends consisting principally of polyurethane have often been used as binders for magnetic recording media. Those binders in which —NCO groups of polyurethane are cross linked with —OH groups of polyol for curing purposes are often used but the resulting coating film itself is too hard and lacking flexibility, so that magnetic recording media capable of enduring abrasion under severe conditions cannot be obtained.

The magnetic recording media according to this invention overcome such disadvantages, because they comprise a blend obtained by adding 10–50% by weight of butyl cellulose acetate resin to a main binder of urethane prepolymer containing 20–60% by weight of urethane elastomer and by adding further, as a hardener, a stoichiometric amount of aromatic polyamine with respect to the —NCO groups in the urethane prepolymer. To this blend a magnetic powder is added, thus resulting in recording media of excellent coating and abrasion-resistant properties.

Figure 1:
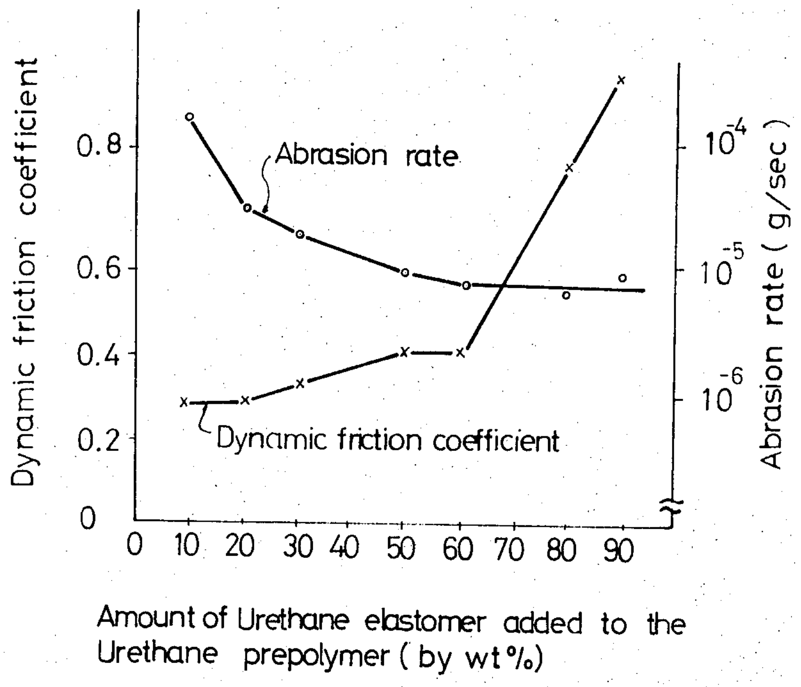
Figure 2:
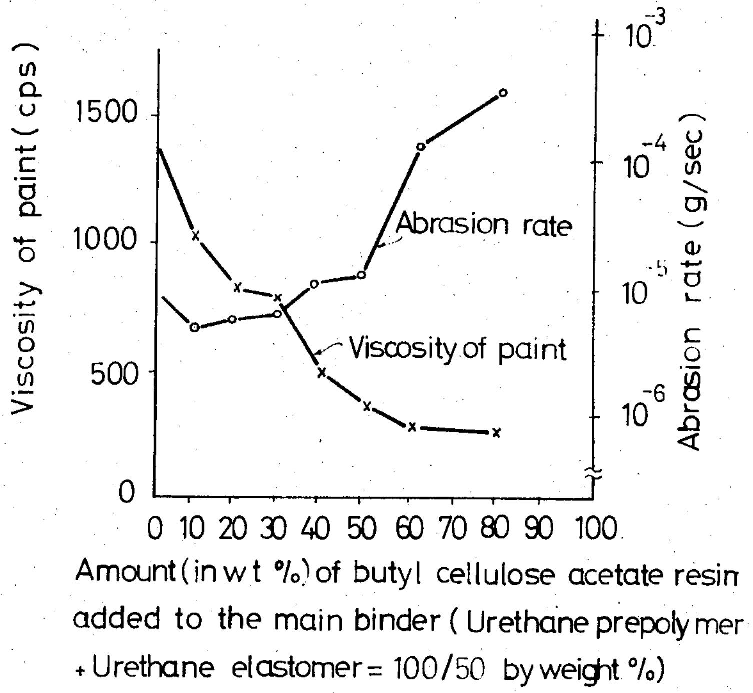

These and other advantages of the present invention will become apparent from the following detailed description thereof and from the accompanying drawings, in which:

FIG. 1 shows graphically the criticality of the urethane elastomer additions to the prepolymer; and FIG. 2 shows, also graphically, the criticality of the acetate resin additions to the base or main binder employed in the invention.

The reasons why the amounts of the components in the binder used for the magnetic recording media of this invention are critically limited may be explained as follows:

(i) As to the criticality in the amount of urethane elastomer added to the urethane prepolymer:

As clearly shown in FIG. 1, if the amount of urethane elastomer added to the urethane prepolymer exceeds 60% by weight, the coating film is too soft, thus resulting in too large a dynamic friction coefficient so that the running of the tape is hindered or irregular sounds are generated during the running. Conversely, if the amount of urethane elastomer added is less than 20% by weight, the coating film is too hard, thus resulting in increased brittleness so that the abrasion-resistant properties are highly deteriorated. The preferred range for the elastomer is therefore between 20 and 60%.

The main binder may consist of Hyprene U-30, trademark, manufactured by Mitsui Toatsu Kagaku K.K., a polyether urethane prepolymer having an average molecular weight of about 20,000–30,000, derived from 2,4-toluene diisocyanate and a polyhydroxybutylene of the formula

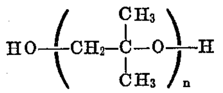

as urethane prepolymer and of Paraprene 22S, trademark, manufactured by Nippon Polyurethane K.K., a polyester urethane elastomer having an average molecular weight of about 20,000–30,000, derived from 4,4'-diphenylmethane diisocyanate and at least one polyester selected from polyethylene adipates of the formula $$\text{-(}OCH_2—CH_2—O—CO(CH_2)_4CO\text{)-}$$

and polypropylene adipates of the formula $$\text{-(}O—CH(CH_3)CH_2OCO(CH_2)CO\text{)-}_n$$

as urethane elastomer. A magnetic powder of $\gamma$-$Fe_2O_3$ is added in the blending weight ratio of $\gamma$-$Fe_2O_3$/main binder=3/1. 5% by weight, based on the main binder, of butyl stearate, as lubricant, and, optionally, 5% by weight, based on said $\gamma$-$Fe_2O_3$, of sodium dodecylbenzenesulfonate, as dispersing agent, are added to form the necessary blend. This blend is admixed for about 50 hrs. in a ball mill and a stoichiometric amount of metaphenylenediamine, as hardener for the —NCO groups in the urethane prepolymer, is added to the blend and mixed uniformly therewith. The resulting magnetic paint is coated on a polyester base and dried to form a tape, which is subjected to the surface processing.

(ii) As to the criticality in the amount of butyl cellulose acetate resin added to the main binder (urethane polymer+urethane elastomer):

As clearly shown in FIG. 2, if the amount of butyl cellulose acetate resin added exceeds 50% by weight, the coating film is too hard, thus resulting in increased brittleness and deterioration of abrasion-resistant properties.

Conversely, if the amount of butyl cellulose acetate added is less than 10% by weight, the viscosity of the magnetic paint increases excessively to deteriorate the printability on the coating. The preferred range for the acetate resin lies therefore between 10 and 50%.

For the determination of the rate of abrasion, a Taber Abrasion Testing Machine was used. To properly compare the magnetic recording material prepared according to this invention with previously known magnetic recording materials, the control sample will first be described and the samples made according to this invention will then be described to illustrate the advantages of the present invention.

CONTROL

| | Parts by wt. |
|---|---|
| Urethane elastomer | 70 |
| Phenoxy resin | 30 |
| Hardener (toluenediisocyanate) | 15 |
| Dispersing agent (sodium dodecylbenzene sulfonate) | 5 |
| Lubricant (butyl stearate) | 5 |
| Solvent (4:3:1:0.5:1 mixture of tetrahydrofuran/dimethylformamide / methylethyilketone / cyclohexanone/toluene) | 950 |

300 parts by weight of $\gamma$-$Fe_2O_3$ as magnetic powder were mixed with the blend of the above mentioned formulation, ball milled for about 50 hrs., coated to a thickness of about 10μ on a polyester base, dried to form a tape, which was then subjected to the surface processing. The rate of abrasion of the resulting magnetic tape was measured to be $5\times10^{-4}$ g./sec. and the abrasion resistance thereof was found to be very unsatisfactory.

EXAMPLE 1

| | Parts by wt. |
|---|---|
| Urethane elastomer | 50 |
| Urethane prepolymer | 100 |
| Butyl cellulose acetate resin | 45 |
| Hardener (metaphylenediamine) | 15 |
| Dispersing agent (sodium dodecylbenzene sulfonate) | 30 |
| Lubricant (butyl stearate) | 10 |
| Solvent (3:2:2:2:1.5 mixture of tetrahydrofuran/dimethylformamide/methylethyleketone/methylisobutylketone/toluene) | 1050 |

585 parts by weight of $\gamma$-$Fe_2O_3$ as magnetic powder were mixed with the blend of the above mentioned formulation, ball milled for about 50 hrs., coated to a thickness of about 10$\mu$ on a polyester base and dried to form a tape, which was then subjected to the surface processing. The rate of abrasion of the resulting magnetic tape was measured to be $8\times10^{-6}$ g./sec. and the abrasion resistance was found to be excellent.

EXAMPLE 2

| | Parts by wt. |
|---|---|
| Urethane elastomer | 50 |
| Urethane prepolymer | 100 |
| Butyl cellulose acetatee resin | 30 |
| Hardener (metaphenylenediamine) | 15 |
| Dispersing agent (sodium dodecylbenzene sulfonate) | 27 |
| Lubricant (butyl stearate) | 9 |
| Solvent (3:2:2:2:1.5 mixture of tetrahydrofuran/dimethylformamide/methylethylketone/methylisobutylketone/toluene) | 1050 |

540 parts by weight of $\gamma$-$F_2O_3$ as magnetic powder were mixed with the blend of the above mentioned formulation, and the same procedure of Example 1 was repeated. The rate of abrasion of the resulting magnetic tape was $8\times10^{-6}$ g./sec. and the abrasion resistance was found to be excellent.

As demonstrated in the two examples above, the addition of butyl cellulose acetate improves the fluidity of the magnetic paint so that the printability on the coating is greatly improved, and the coated surface of the magnetic tape is exceedingly smooth. The hardness of the coated film can be controlled within the optimum range, so that the abrasion resistance can be highly improved.

What is claimed is:

1. A magnetic recording medium comprising: a base and a coating thereon consisting essentially of a binder consisting of from 20 to 60 weight percent of a urethane elastomer and from 40 to 80 weight percent of a urethane prepolymer having —NCO groups: butyl cellulose acetate resin in amounts of from 10 to 50 weight percent based on said binder; an aromatic polyamine, as hardener, in stoichiometric amount with respect to the —NCO groups in said prepolymer; and a magnetic powder.

2. The magnetic recording medium as claimed in claimed 1, wherein said magnetic powder is $\gamma$-$Fe_2O_3$ powder.

3. The magnetic recording medium as claimed in claim 1, wherein said hardener is metaphenylene diamine.

References Cited

UNITED STATES PATENTS

| | | | |
|---|---|---|---|
| 3,320,090 | 5/1967 | Graubart | 117—237 |
| 3,387,995 | 6/1968 | Senkpiel et al. | 117—235 |
| 3,357,855 | 12/1967 | Bisschops et al. | 252—62.54 X |
| 3,418,161 | 12/1968 | Bauer | 252—62.54 X |
| 3,427,191 | 2/1969 | Howell et al. | 252—62.54 X |
| 3,437,510 | 4/1969 | Diaz | 252—62.54 X |
| 3,473,960 | 10/1969 | Jacobson et al. | 117—235 X |
| 3,490,945 | 1/1970 | Slouinsky | 117—235 |
| 3,509,232 | 4/1970 | Schollenberger | 260—858 |
| 3,558,353 | 1/1971 | Harada et al. | 117—235 |
| 3,574,684 | 4/1971 | Higashi | 117—235 |

WILLIAM D. MARTIN, Primary Examiner

B. D. PIANALTO, Assistant Examiner

U.S. Cl. X.R.

117—161 KP; 252—62.54; 260—858